US010666742B2

(12) United States Patent
Tsai et al.

(10) Patent No.: US 10,666,742 B2
(45) Date of Patent: May 26, 2020

(54) SOFTWARE DEFINED NETWORK CONTROLLER AND NETWORK SERVICE ALLOCATING SYSTEM AND METHOD

(71) Applicant: NANNING FUGUI PRECISION INDUSTRIAL CO., LTD., Nanning (CN)

(72) Inventors: Cheng-Yen Tsai, New Taipei (TW); Yu-Chung Lin, New Taipei (TW); Yen-Chen Lu, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 389 days.

(21) Appl. No.: 15/412,133

(22) Filed: Jan. 23, 2017

(65) Prior Publication Data

US 2018/0176308 A1 Jun. 21, 2018

(30) Foreign Application Priority Data

Dec. 15, 2016 (TW) .............................. 105141605 A

(51) Int. Cl.
*G06F 15/173* (2006.01)
*H04L 29/08* (2006.01)
(Continued)

(52) U.S. Cl.
CPC ............ *H04L 67/16* (2013.01); *H04L 45/121* (2013.01); *H04L 45/127* (2013.01);
(Continued)

(58) Field of Classification Search
CPC ..... H04L 67/16; H04L 45/121; H04L 45/127; H04L 45/306; H04L 45/3065; H04L 45/38; H04L 45/42; H04L 45/64
See application file for complete search history.

(56) References Cited

U.S. PATENT DOCUMENTS 9,654,395 B2\* 5/2017 Park ...................... H04L 45/745
2014/0269724 A1\* 9/2014 Mehler .................... H04L 45/30
370/392
(Continued)

FOREIGN PATENT DOCUMENTS

CN 104767695 A 7/2015
CN 105871718 A 8/2016
(Continued)

*Primary Examiner* — Jonathan A Bui
(74) *Attorney, Agent, or Firm* — ScienBiziP, P.C.

(57) ABSTRACT

A network service allocating system for a software defined network (SDN) includes an SDN controller, a plurality of SDN switches, a cloud server, and a local server. The SDN controller includes modules for service managing and path managing. Each SDN switch can receive a packet from a client and send the packet to the SDN controller. The service managing module analyzes the packet to identify type of service required and allocates the network service to the cloud server or to the local server according to the type of service required. The path managing module plans an optimum transmission path and sends the path to the SDN controller. Thereby, the SDN switch can obtain the network service. An SDN controller and a network service allocating method are also provided.

20 Claims, 7 Drawing Sheets

(51) Int. Cl.
  *H04L 12/727* (2013.01)
  *H04L 12/725* (2013.01)
  *H04L 12/715* (2013.01)
  *H04L 12/717* (2013.01)
  *H04L 12/721* (2013.01)
(52) U.S. Cl.
  CPC ........ *H04L 45/306* (2013.01); *H04L 45/3065* (2013.01); *H04L 45/38* (2013.01); *H04L 45/42* (2013.01); *H04L 45/64* (2013.01)

(56) References Cited

U.S. PATENT DOCUMENTS

| | | |
|---|---|---|
| 2014/0298052 A1 | 10/2014 | Meirosu et al. |
| 2016/0080251 A1 | 3/2016 | Ramachandran et al. |
| 2017/0331794 A1* | 11/2017 | Lokman .............. H04L 63/0428 |
| 2018/0034723 A1* | 2/2018 | Shao ........................ H04L 45/02 |
| 2018/0227225 A1* | 8/2018 | Zhai ........................ H04L 29/08 |

FOREIGN PATENT DOCUMENTS

| | | |
|---|---|---|
| CN | 106209413 A | 12/2016 |
| CN | 104734957 B | 3/2018 |
| WO | WO-2015154275 A1 * | 10/2015 |

* cited by examiner

SOFTWARE DEFINED NETWORK CONTROLLER AND NETWORK SERVICE ALLOCATING SYSTEM AND METHOD

FIELD

The subject matter herein generally relates to network communication.

BACKGROUND

A routing device or a switch may be used to provide network services for a client. The client can obtain network services from a remote server through the routing device or switch, which causes a time delay.

BRIEF DESCRIPTION OF THE DRAWINGS

Implementations of the present disclosure will now be described, by way of example only, with reference to the attached figures.

DETAILED DESCRIPTION

Figure 1:
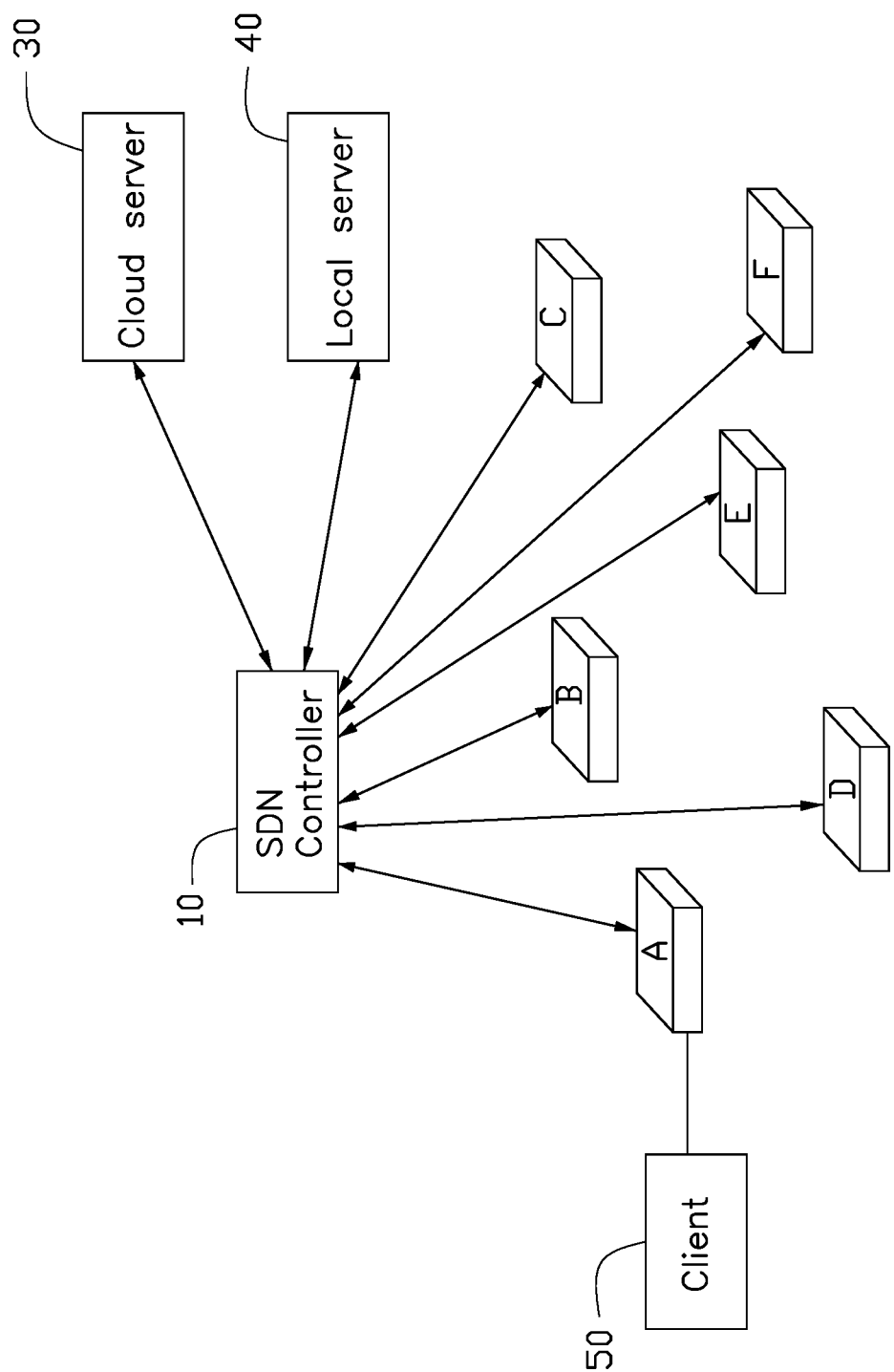
FIG. 1 is a block diagram of one exemplary embodiment of a network service allocating system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

The present disclosure is described in relation to a network service allocating system to provide one network service according to a requested service type from a client.

FIG. 1 illustrates an exemplary embodiment of network service allocating system which comprises a software defined network (SDN) controller 10, a plurality of SDN switches, a cloud server 30, and a local server 40. The plurality of SDN switches is located on a plurality of transmission paths. The SDN controller 10 is connected to the plurality of SDN switches.

The SDN controller 10 is located in a network. The network comprises the plurality of SDN switches, the cloud server 30, the local server 40, and the client. The cloud server 30 and the local server 40 are configured to provide network services. The client 50 is connected to the network through the plurality of SDN switches to obtain the network service. In one exemplary embodiment, the number of the SDN switches is six, namely a first SDN switch A, a second SDN switch B, a third SDN switch C, a fourth SDN switch D, a fifth SDN switch E, and a sixth SDN switch F.

Figure 2:
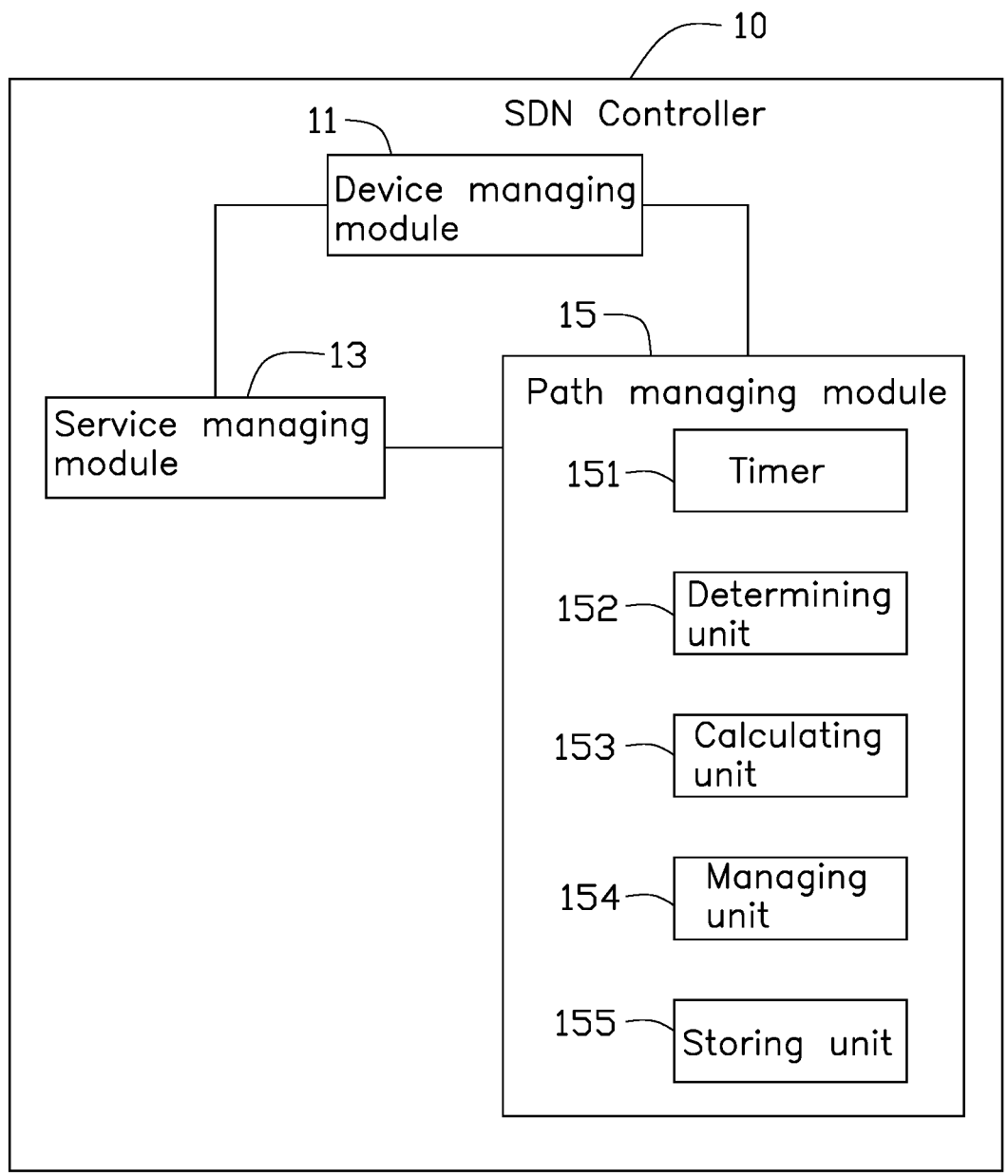
FIG. 2 is a block diagram of one exemplary embodiment of a software defined network (SDN) controller of the network service allocating system of FIG. 1.

FIG. 2 illustrates that the SDN controller 10 comprises a device managing module 11, a service managing module 13, and a path managing module 15. The device managing module 11 is connected to the service managing module 13 and the path managing module 15. The service managing module 13 is connected to the path managing module 15.

The path managing module 15 comprises a timer 151, a determining unit 152, a calculating unit 153, a managing unit 154, and a storing unit 155. The storing unit 155 stores at least one predetermined value, a process queue, and a service queue.

In one exemplary embodiment, the client 50 is configured to make a request to the network service by sending a packet to first SDN switch A. The first SDN switch A is configured to send the packet to the SDN controller 10.

The device managing module 11 is configured to collect source information of the first SDN switch A and is configured to install the network service. In one exemplary embodiment, the source information comprises central processing unit (CPU) load information of each SDN switch and time delay information of each SDN switch. The time delay information comprises first time-delayed data in the SDN switches which communicate with each other through network communication and second time-delayed data as to network communication between the SDN switches and the cloud server 30.

The service managing module 13 is configured to manage the network services and allocate the network services. Specifically, the service managing module 13 stores a service type of each network service. The service type may be time-sensitive or non-time-sensitive. The service managing module 13 is configured to identify the service type of the packet from the client 50 as to being time-sensitive or being non-time-sensitive. The service managing module 13 is configured to allocate the network service to the cloud server 30 or the local server 40 according to the service type of the network service. When the service managing module 13 determines that the service type of the network service of the packet is time-sensitive, the service managing module 13 allocates the network service to the local server 40 and sends a first command to the path managing module 15. When the service managing module 13 determines that the service type of the network service of the packet is non-time-sensitive, the service managing module 13 allocates the network service to the cloud server 30 and sends a second command to the path managing module 15. In one exemplary embodiment, the service managing module 13 can store one service type (such as an audio service or a video service) as being time-sensitive, and can store another service type (such as a download) as being non-time-sensitive.

The device managing module 11 is further configured to install the network service to one SDN switch. Specifically, when the network service is allocated to the cloud server 30 or the local server 40, the device managing module 11 obtains the network service from the cloud server 30 or from the local server 40, and installs the network service to one SDN switch. Thus, the client 50 can obtain the network service from an SDN switch through the network communication.

The path managing module 15 is configured to execute one algorithm according to the received command, and to plan an optimum transmission path according to the algorithm. Specifically, the path managing module 15 executes a first algorithm when receiving the first command. The path managing module 15 executes a second algorithm when receiving the second command.

In one exemplary embodiment, the transmission path having minimum cost is regarded as the optimum transmission path. The path managing module 15 plans a shortest transmission path according to the first algorithm when receiving the first command. The path managing module 15 plans one shortest transmission path according to the second algorithm when receiving the second command.

Figure 3:
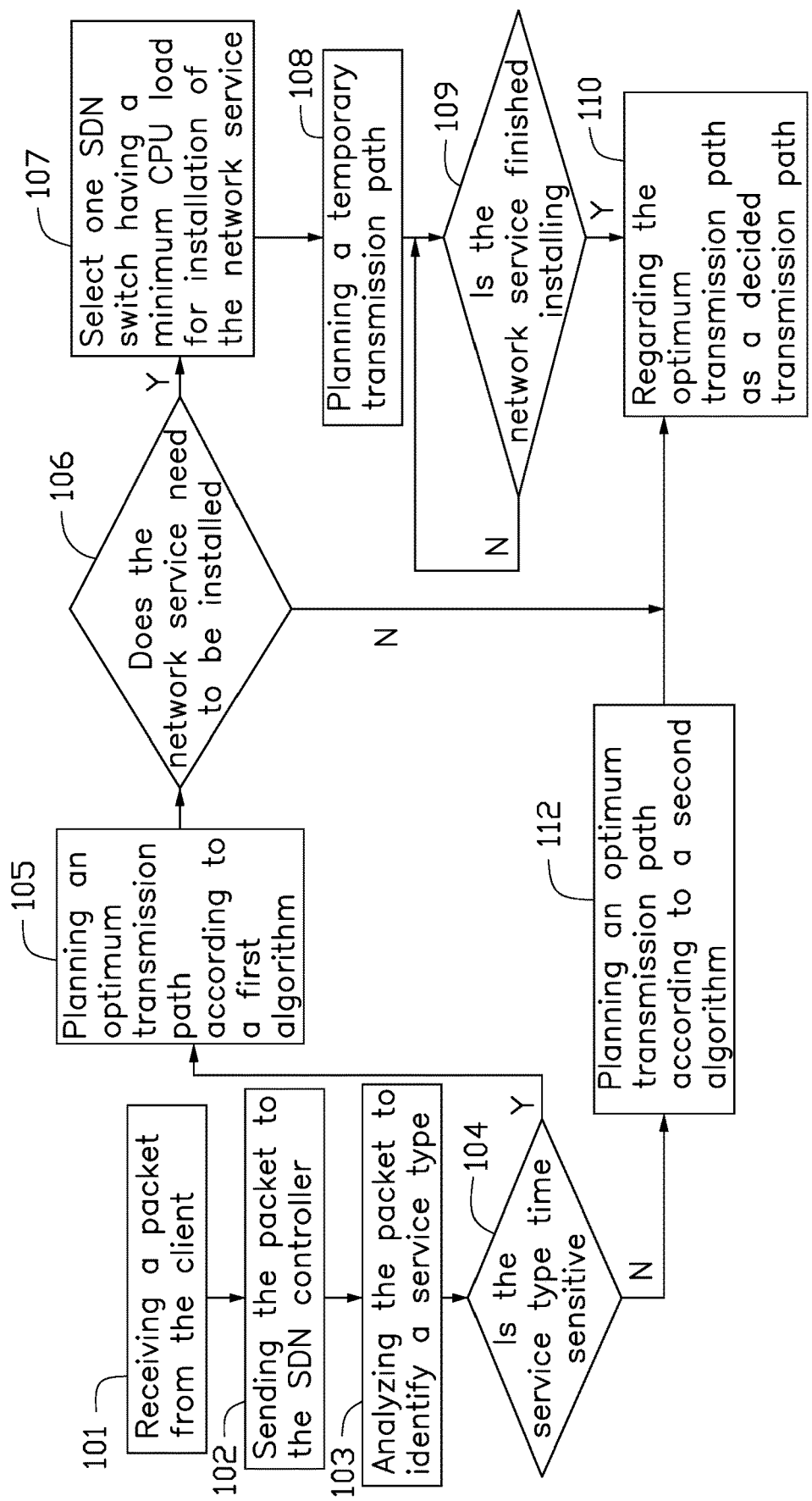
FIG. 3 is a flow chart of one exemplary embodiment of a network service allocating method.

FIG. 3 illustrates a flowchart of a method in accordance with an example embodiment. A network service allocating method is provided by way of example, as there are a variety of ways to carry out the method. The network service allocating method described below can be carried out using the configurations illustrated in FIGS. 1-2, for example, and various elements of these figures are referenced in explaining the network service allocating method. The illustrated order of blocks is by example only and the order of the blocks can change. Additional blocks may be added or fewer blocks may be utilized without departing from this disclosure. The network service allocating method can begin at block 101.

At block 101, the first SDN switch A receives a packet from the client 50. Specifically, the client 50 sends the packet to the first SDN switch A to request a network service.

At block 102, the first SDN switch A sends the packet to the SDN controller 10.

At block 103, the service managing module 13 of the SDN controller 10 analyzes the packet to identify a desired service type of the network service. Specifically, the desired service type of the network service may be time-sensitive or non-time-sensitive.

At block 104, the service managing module 13 determines whether the desired service type is time-sensitive. If yes, the method goes to block 105; if no, the method goes to block 112.

At block 105, the service managing module 13 sends the first command to the path managing module 15, and the path managing module 15 plans one optimum transmission path according to the first algorithm. In one exemplary embodiment, the optimum transmission path is a shortest transmission path.

Figure 4:
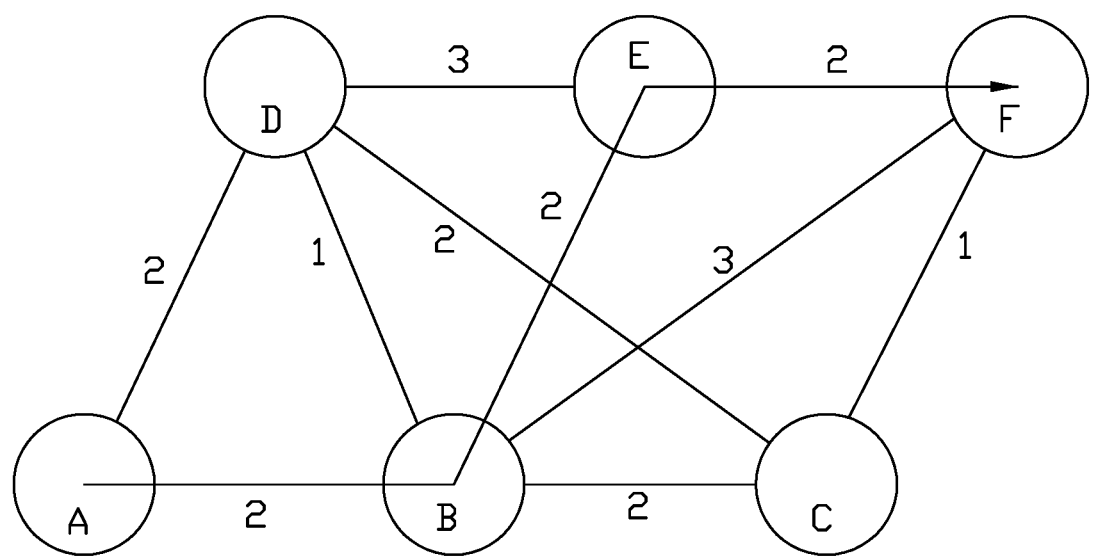
FIG. 4 is a graphic depiction of a routing by SDN switches of the system of FIG. 1.

At block 106, the determining unit 152 of the path managing module 15 determines whether the network service needs to be installed. If yes, the method goes to block 107; if no, the method goes to goes to block 110. Specifically, if none of the SDN switches in the planned shortest transmission path can provide the network service, the determining unit 152 determines that the network service needs to be installed. FIG. 4 illustrates that in one exemplary embodiment, none of the SDN switches A, B, E, and F in the planned shortest transmission path can provide the network service switches, thus the determining unit 152 determines that the network service needs to be installed. If at least one SDN switch in the planned shortest transmission path can provide the network service, the determining unit 152 determines the network service does not need to be installed.

At block 107, the device managing module 11 selects one SDN switch having a minimum CPU load for installation of the network service. Specifically, the service managing module 13 allocates the network service to the local server 40, and the device managing module 11 selects the SDN switch on the shortest transmission path which has minimum CPU load. The network service through the network is obtained from the local server 40, and the obtained network service is installed to the SDN switch which has the minimum CPU load. In one exemplary embodiment, the CPU load of SDN switch E is at a minimum, and the device managing module 11 installs the network service to the SDN switch E.

At block 108, the managing unit 154 plans a temporary transmission path. Specifically, the temporary transmission path is configured to be connected to the cloud server 30. The SDN switch is connected to the network through the temporary transmission path. Thus, the device managing module 11 selects the SDN switch having the minimum CPU load on the temporary transmission path and obtains the network service from the cloud server 30.

At block 109, the determining unit 152 determines whether the device managing module 11 has completed installing the network service. If yes, the method goes to block 110; if no, the method goes to goes to block 109. Specifically, the determining unit 152 makes a determination as to whether the device managing module 11 has finished installing the network service to the SDN switch until the device managing module 11 has completed installing network service to the SDN switch having the minimum CPU load.

At block 110, the path managing module 15 regards the planned optimum transmission path as a decided transmission path and sends the planned optimum transmission path to the SDN switch. Thus, the SDN switches on the optimum transmission path can communicate with each other through the network, thereby enabling the SDN switches to obtain network service from the cloud server 30 or from the local server 40.

At block 112, the service managing module 13 sends the second command to the path managing module 15, the path managing module 15 plans one optimum transmission path according to the second algorithm.

In the network service allocating method, when the client 50 requests a time-sensitive network service, the service managing module 11 allocates the network service to the local server 40. Such allocation enables the SDN switches to obtain the network service from the local server 40 through the network communication according to the decided transmission path. When the client 50 requests a non-time-sensitive network service, the service managing module 13 allocates the network service to the cloud server 30, thereby enabling the client 50 to obtain the network service 50 from the cloud server 30 according to the decided transmission path.

The timer 151 is started to enable the timer 151 to count time from when the path managing module 15 executes the first algorithm.

Figure 5:
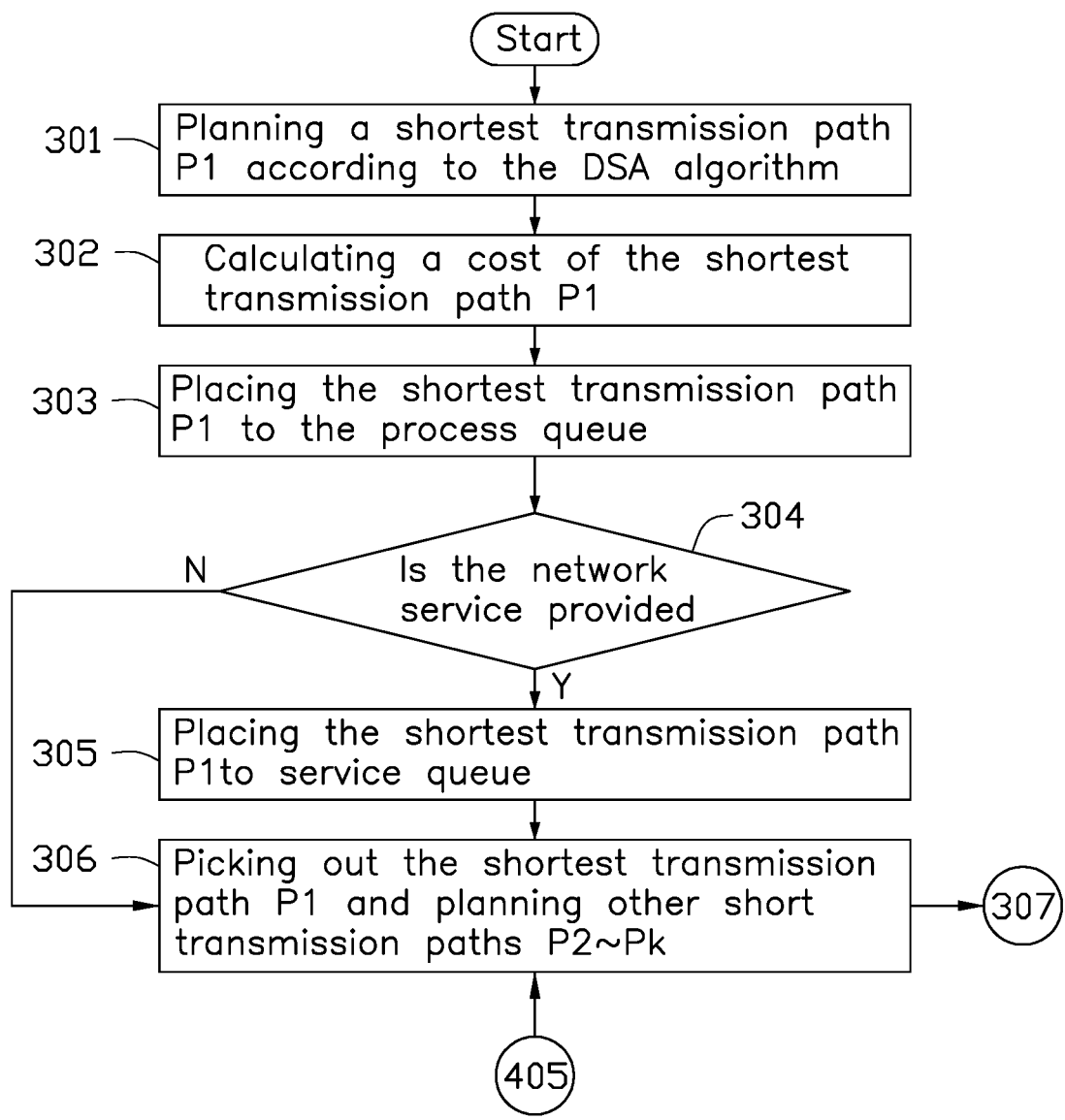
FIGS. 5-6 is a flow chart of one exemplary embodiment of a first algorithm of the network service allocating method of FIG. 3.
Figure 6:
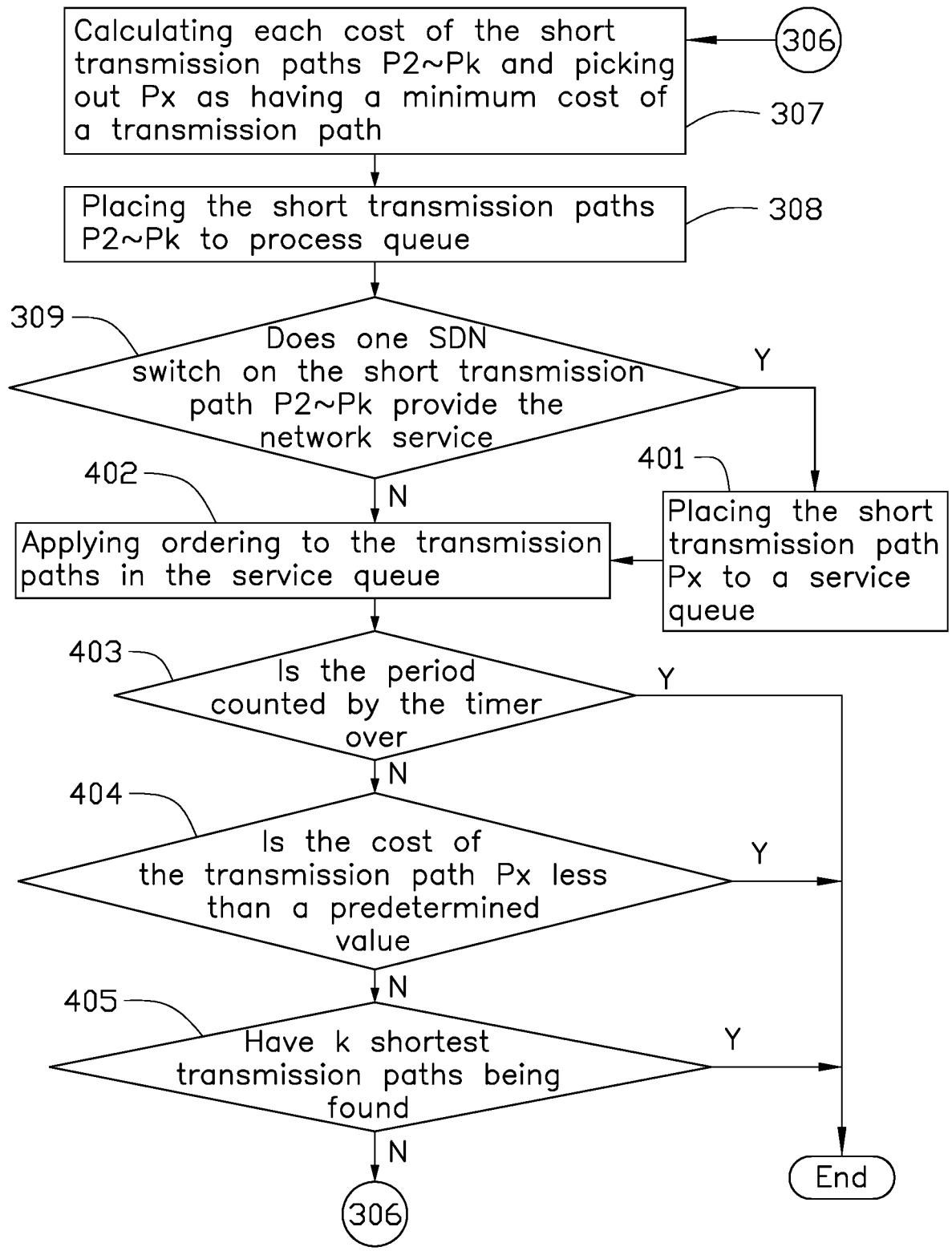

FIGS. 5-6 illustrate a flowchart of one exemplary embodiment of a first algorithm of the network service allocating method of FIG. 3. The method of the first algorithm is provided by way of example, as there are a variety of ways to carry out the method. The first algorithm described below can be carried out using the configurations illustrated in FIGS. 1-3, for example, and various elements of these figures are referenced in explaining first algorithm. The illustrated order of blocks is by example only and the order of the blocks can change. Additional blocks may be added or fewer blocks may be utilized without departing from this disclosure. The method of the first algorithm can begin at block 301.

At block 301, the managing unit 154 of the path managing module 15 plans a shortest transmission path P1 according to a dynamic service allocation (DSA) algorithm.

At block 302, the calculating unit 153 calculates a cost of the shortest transmission path P1. FIG. 4 is a graphic depiction of a routing by SDN switches of the network service allocating system of FIG. 1, in one exemplary embodiment, the shortest transmission path P1 (A-B-E-F) passes through SDN switch A, SDN switch B, SDN switch E, and SDN switch F. The SDN switch E is configured to provide the network service for the client 50. A cost between the SDN switch A and the SDN switch B is 2. A cost between the SDN switch B and the SDN switch C is 2. A cost between the SDN switch B and SDN switch D is 1. A cost between the SDN switch B and SDN switch E is 2. A cost between the SDN switch D and SDN switch E is 3. A cost between SDN switch E and SDN switch F is 2. The calculating unit 153 calculates the cost of the shortest transmission path P1 (A-B-E-F) as: 2+2+2=6.

Referring back to FIG. 5, at block 303, the managing unit 154 places the shortest transmission path P1 to the process queue.

At block 304, the determining unit 152 determines whether a single SDN switch on the shortest transmission path P1 can provide the network service. If yes, the method goes to block 305; if no, the method goes to block 306. In the exemplary embodiment, the SDN switch E is able to provide the network service for the client 50.

At block 305, the managing unit 154 places the shortest transmission path P1 to the service queue.

At block 306, the managing unit 154 picks out the shortest transmission path P1 from the process queue and plans other shorter transmission paths P2~Pk. In one exemplary embodiment, in the plan of the managing unit 154, one of the shorter transmission paths P2~Pk is the transmission path P2.

Referring to FIG. 6, at block 307, the calculating unit 153 calculates each cost of the shorter transmission paths P2~Pk and picks out Px as having a minimum cost of a transmission path. In the exemplary embodiment, the calculating unit 153 calculates the cost of the transmission path P2 (A-D-E-F) as: 2+3+2=7.

At block 308, the managing unit 154 places the shorter transmission paths P2~Pk to the process queue.

At block 309, the determining unit 152 determines whether or not Px, as a shorter transmission path, is on the shorter transmission paths P2~Pk, of which one SDN switch can provide the network service. If yes, the method goes to block 401; if no, the method goes to goes to block 402. In the exemplary embodiment, the determining unit 152 determines that SDN switch E on the shorter transmission path P2 can provide the network service, then the method goes to block 401.

At block 401, the managing unit 154 places the shorter transmission path Px to the service queue. Specifically, when one SDN switch on the shorter transmission path Px of the transmission paths P2~Pk can provide the network service, the managing unit 154 places the shorter transmission path Px to the service queue. In the exemplary embodiment, the SDN switch E on the shorter transmission path P2 can provide the network service, thus the managing unit 154 places the shorter transmission path P2 to the service queue.

At block 402, the managing unit 154 applies order to the transmission paths in the service queue according to the cost from lesser to greater. Specifically, for example, the cost of the shorter transmission path P2 is less than the cost of the shorter transmission path Pk, and the cost of the shorter transmission path Pk is less than the cost of the shorter transmission path Pn. The managing unit 154 thus applies ordering to the shorter transmission path P2, the shorter transmission path Pk, and the shorter transmission path Pn as P2, Pk, Pn in the service queue.

At block 403, the determining unit 152 determines whether the period counted by timer 151 is over. If yes, the method goes to end; if no, the method goes to block 404. Specifically, the determining unit 152 determines that the time period counted by the timer 151 is greater than a predetermined time.

At block 404, the determining unit 152 determines whether the cost of the shorter transmission path Px is less than the predetermined value. If yes, the method goes to end; if no, the method goes to goes to block 405.

At block 405, the determining unit 152 determines whether k transmission paths have been found. If yes, the method goes to end; if no, the method goes to goes to block 306.

At the first algorithm method, when no one transmission path in the k transmission paths P1~Pk found has one SDN switch that can provide the network service, the managing unit 154 selects one SDN switch having the minimum CPU load and installs the network service to the SDN switch having the minimum CPU load. Unit 154 acts by reference to the CPU load information collected by the device managing module 11. Thus, the client 50 can obtain the network service from the SDN switch having the minimum CPU load.

The timer 151 is started to enable the timer 151 to count time when the path managing module 15 executes the second algorithm.

Figure 7:
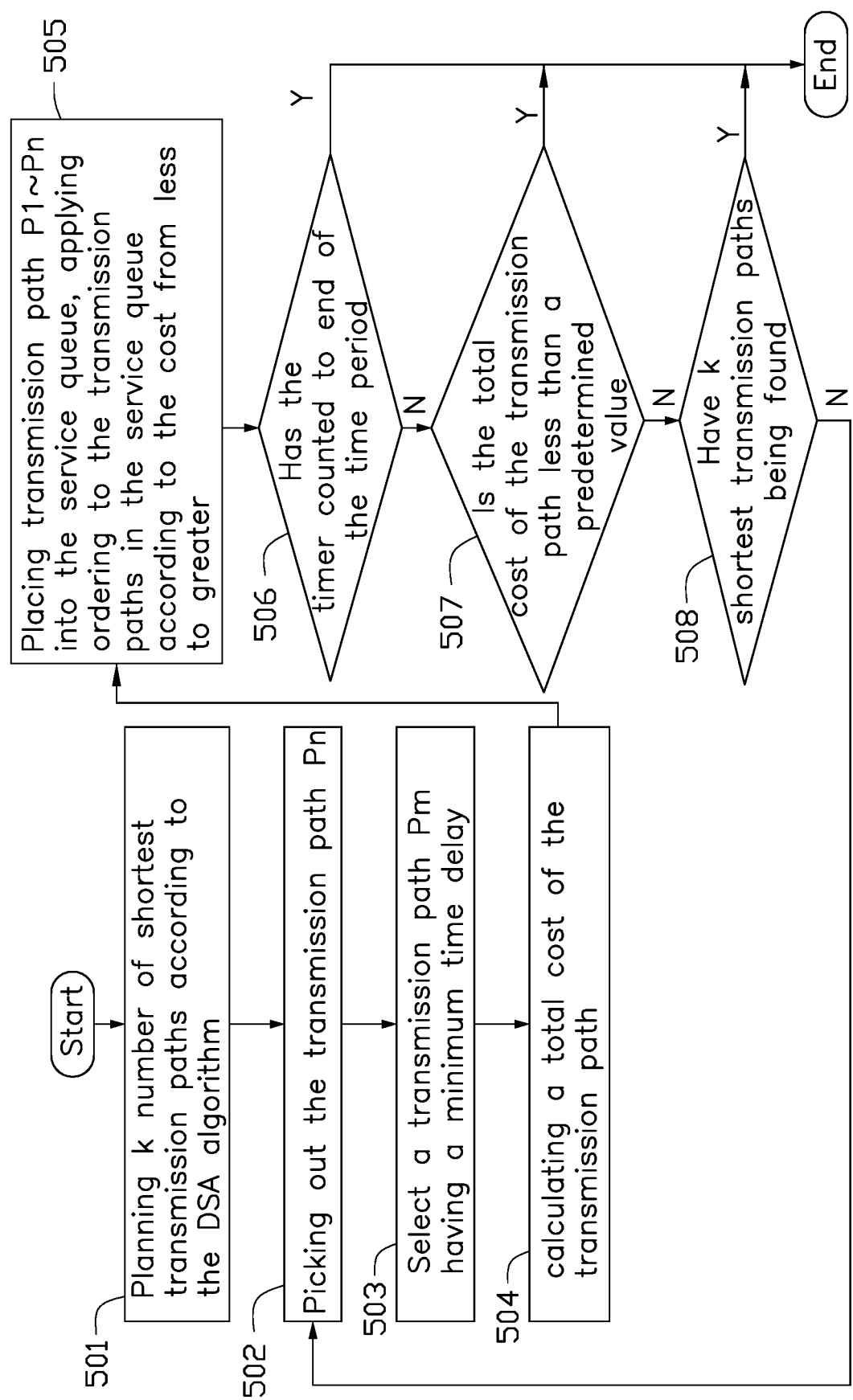
FIG. 7 is a flow chart of one exemplary embodiment of a second algorithm of the network service allocating method of FIG. 3.

FIG. 7 illustrates a flowchart of one exemplary embodiment of a method of the second algorithm of the network service allocating method of FIG. 3. The second algorithm is provided by way of example method, as there are a variety of ways to carry out the method. The second algorithm described below can be carried out using the configurations illustrated in FIGS. 1-3, for example, and various elements of these figures are referenced in explaining second algorithm. The illustrated order of blocks is by example only and the order of the blocks can change. Additional blocks may be added or fewer blocks may be utilized without departing from this disclosure. The second algorithm can begin at block 501.

At block 501, the managing unit 154 plans k number of shortest transmission paths according to the DSA algorithm.

At block 502, the managing unit 154 picks out a transmission path Pn. Specifically, beginning at n=1, the path managing module 15 picks out the transmission path Pn.

At block 503, one SDN switch that has a minimum time delay according to data in one transmission path Pm of the transmission path Pn is selected. Specifically, the path managing module 15 inserts the transmission path Pm in the transmission paths P1~Pn. The SDN switch is located on the transmission path Pm, and the time delay between the first SDN switch A and the cloud server 30 is minimal.

At block 504, the calculating unit 153 calculates a total cost of the transmission path Pm. Specifically, the calculating unit 153 calculates the total cost of the transmission path Pm as equal to the cost of the transmission path Pm plus the cost of the SDN switch connected to the cloud server 30.

At block 505, the managing unit 154 places the transmission paths P1~Pn into the service queue, and applies ordering to the transmission paths in the service queue according to the cost from less to greater. Specifically, for example, the cost of the transmission path P1 is less than the cost of the transmission path P2, and the cost of the transmission path P2 is less than the cost of the transmission path Pn. The managing unit 154 then orders the transmission path P1, the transmission path P2, and the transmission path Pn into the service queue as P1, P2, and Pn, in that order.

At block 506, the determining unit 152 determines whether the timer 151 has counted to end of the time period. If yes, the method goes to end; if no, the method goes to goes to block 507. Specifically, the determining unit 152 determines whether the time period counted by the timer 151 is greater than the predetermined time.

At block 507, the determining unit 152 determines whether the cost of the transmission path is less than a predetermined value. If yes, the method goes to end; if no, the method goes to goes to block 508.

At block 508, the determining unit 152 determines whether k transmission paths have been found. If yes, the method goes to end; if no, the method goes to block 502.

In the second algorithm method, the time delay is a minor matter. One transmission path Px having a minimal time delay between the first SDN switch A and the cloud server 30 is selected and regarded as the selected transmission path from the k number of shortest transmission paths in the plan. Thus, the client 50 can obtain the network service from an SDN switch by the transmission path Px.

In the network service allocating system and method, when the client 50 requests a time-sensitive network service, the service managing module 11 allocates the network service to the SDN switch having the minimum CUP load. When the client 50 requests a non-time-sensitive network service, the client 50 can obtain the network service from the cloud server 30 through an SDN switch which has minimum cost of the transmission path. Thus, the SDN controller 10 can provide network services to meet demands of the client 50, according to the type of network service required by the client 50.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A network service allocating system comprising:
   a software defined network (SDN) controller having:
      a service managing module; and
      a path managing module connected to the service managing module, wherein the path managing module further comprises a storage, and the storage stores a process queue and a service queue;
   a plurality of SDN switches located on a plurality of transmission paths and connected to the SDN controller;
   a cloud server; and
   a local server;
   wherein a first SDN switch of the plurality of SDN switches is configured to:
      receive a packet from a client; and
      send the packet to the SDN controller;
   wherein the service managing module is configured to:
      analyze the packet to identify a service type of a network service corresponding to the packet; and
      allocate the network service to the cloud server or the local server according to the service type of the network service;
   wherein the path managing module is configured to:
      plan an optimum transmission path according to the service type of the network service; and
      send the optimum transmission path to the SDN switches on the optimum transmission path;
      wherein the SDN switches on the optimum transmission path are configured to obtain the network service from the cloud server or from the local server.

2. The network service allocating system of claim 1, wherein the SDN controller further comprises a device managing module, wherein the device managing module is connected to the service managing module and the path managing module, the device managing module collects source information of the SDN switches, and the source information comprises central processing unit (CPU) load information of each SDN switch.

3. The network service allocating system of claim 2, wherein the device managing module further selects an SDN switch having a minimum CPU load on the shortest transmission path, obtains the network service through the network from the local server, and installs the network service to the SDN switch having the minimum CPU load.

4. The network service allocating system of claim 3, wherein the path managing module is further configured to plan a temporary transmission path, the temporary transmission path is configured to be connected to the cloud server, the SDN switch is connected to the network through the temporary transmission path, and the device managing module selects the SDN switch having the minimum CPU load on the temporary transmission path and obtains the network service from the cloud server through the network.

5. The network service allocating system of claim 1, wherein the path managing module comprises a determining unit, a calculating unit, and a managing unit, and when the service managing module identifies the service type to be time-sensitive, the calculating unit calculates a cost of a shortest transmission path P1, and the managing unit places the shortest transmission path P1 to the process queue; wherein when the determining unit determines one SDN switch on the shortest transmission path P1 being provided to the network service, the managing unit places the shortest transmission path P1 to the service queue, picks out the shortest transmission path P1 from the process queue, and plans other shorter transmission paths P2-Pk; wherein the calculating unit calculates each cost of the shorter transmission paths P2-Pk and selects a minimum cost of a shorter transmission path Px, and the managing unit places the shorter transmission path P2-Pk to the process queue; and wherein when the determining unit determines one SDN switch on the shorter transmission path Px of the shorter transmission paths P2-Pk being provided to the network service, the managing unit places the shorter transmission path Px to the service queue, and orders the transmission paths in the service queue according to the least cost to the greatest cost.

6. The network service allocating system of claim 5, wherein when the service managing module identifies the service type to be non-time-sensitive, the path managing module picks out a transmission path Pn and selects one SDN switch on a transmission path Pm to enable time delay data between the first SDN switch A and the cloud server to be minimum; wherein the calculating unit calculates a total cost of the transmission path Pm; and wherein the managing unit places the transmission path P1-Pn to the service queue and orders the transmission paths in the service queue according to the least cost to the greatest cost.

7. The network service allocating system of claim 6, wherein the path managing module further comprises a timer, and the determining unit determines whether the timer has counted pass to an end of a time period after the managing unit orders the transmission paths in the service queue according to the least cost to the greatest cost.

8. An SDN controller located in a network, connected to a plurality of SDN switches, and comprising: a service managing module; and a path managing module connected to the service managing module; wherein the path managing module further comprises a storage, and the storage stores a process queue and a service queue; wherein the network comprises the plurality of SDN switches, a cloud server, a local server, and a client; wherein the plurality of SDN switches located on a plurality of transmission paths; wherein a first SDN switch of the plurality of SDN switches is configured to: receive a packet from a client; and send the packet to the SDN controller; wherein the service managing module: analyzes the packet to identify a service type of a network service corresponding to the packet; allocates the network service to the cloud server or the local server according to the service type of the network service; wherein the path managing module: plans an optimum transmission path according to the service type of the network service; and sends the optimum transmission path to the SDN switches on the optimum transmission path.

9. The SDN controller of claim 8, further comprising a device managing module, wherein the device managing module is connected to the service managing module and the path managing module, the device managing module collects source information of the SDN switches, and the source information comprises CPU load information of each SDN switch.

10. The SDN controller of claim 9, wherein the device managing module is configured to select an SDN switch having a minimum CPU load on the shortest transmission path, obtain the network service through the network from the local server, and install the network service to the SDN switch having the minimum CPU load.

11. The SDN controller of claim 9, wherein the source information further comprises time delay information of each SDN switch, the time delay information comprises first time-delayed data in the SDN switches communicated with each other through network and second time-delayed data between the SDN switches and the cloud server communicated with each other through network communication.

12. The SDN controller of claim 11, wherein the path managing module is configured to select one SDN switch on a shortest transmission path Pm, to enable the second time-delayed data the SDN switch connected to the cloud server to be a minimal time delay.

13. A network service allocating method comprising:
receiving a packet from a client by an SDN switch;
sending the packet to an SDN controller by the SDN switch;
analyzing the packet to identify a service type of a network service of the packet by a service managing module of the SDN controller;
allocating the network service to a cloud server or a local server according to the service type of the network service by the service managing module;
planning an optimum transmission path by a path managing module of the network service;
storing a process queue and a service queue by a storage of the path managing module;
regarding the optimum transmission path as a decided transmission path and sending the optimum transmission path to the SDN controller on the optimum transmission path by the path managing module.

14. The network service allocating method of claim 13, further comprising a step of determining whether the network service needs to be installed by the service managing module after the step of planning the optimum transmission path.

15. The network service allocating method of claim 14, further comprising a step of selecting one SDN switch having a minimum CPU load to install the network service after the step of determining the network service needs to be installed.

16. The network service allocating method of claim 13, wherein when the service type of the network service is time-sensitive, the step of the service managing module planning the optimum transmission path comprises:
calculating a cost of a shortest transmission path P1; and
placing the shortest transmission path P1 to the process queue.

17. The network service allocating method of claim 16, wherein after the step of placing the shortest transmission path P1 to the process queue, the step of the service managing module planning the optimum transmission path further comprises:
determining whether one SDN switch on the shortest transmission path P1 being provided to the network service; and
placing the shortest transmission path P1 to the service queue when determining whether one SDN switch on the shortest transmission path P1 being provided to the network service.

18. The network service allocating method of claim 17, wherein after the step of placing the shortest transmission path P1 to the service queue, the step of the service managing module planning the optimum transmission path further comprises: picking out the shortest transmission path P1 from the process queue and planning other shorter transmission paths P2-Pk; calculating each cost of the shorter transmission paths P2-Pk and selecting a shorter transmission path Px having a minimum cost; placing the shorter transmission paths P2-Pk to the process queue; determining whether one SDN switch on the shorter transmission path Px from the shorter transmission paths P2-Pk can provide the network service; placing the shorter transmission path Px to the service queue when the SDN switch on the shorter transmission path Px from the shorter transmission paths P2-Pk being provided to the network service; and ordering the transmission paths in the service queue according to the least cost to the greatest cost.

19. The network service allocating method of claim 13, wherein when the service type of the network service is non-time-sensitive, the step of the service managing module planning the optimum transmission path comprises:
picking out a transmission path Pn; and
selecting one SDN switch on a transmission path Pm of the transmission path Pn, to enable time delay data the SDN switch connected to the cloud server is minimum.

20. The network service allocating method of claim 19, wherein after the step of selecting the SDN switch on the transmission path Pm of the transmission path Pn, the step of the service managing module planning the optimum transmission path further comprises:
  calculating a total cost of the transmission path Pm;
  placing the transmission path P1~Pn to the service queue; and
  ordering the transmission paths in the service queue according to the cost from less to greater after the step of calculating the total cost of the transmission path Pm.

* * * * *